United States Patent [19]

Shi et al.

[11] Patent Number: 5,363,388
[45] Date of Patent: Nov. 8, 1994

[54] CONTINUOUSLY TUNABLE SOLID STATE ULTRAVIOLET COHERENT LIGHT SOURCE

[75] Inventors: Weiqiang Shi; Warren S. Grundfest, both of Los Angeles, Calif.

[73] Assignee: Cedars-Sinai Medical Center, Los Angeles, Calif.

[21] Appl. No.: 781,328

[22] Filed: Oct. 18, 1991

[51] Int. Cl.$^5$ ............................................. H01S 3/10
[52] U.S. Cl. ........................................ 372/20; 359/329
[58] Field of Search ........................ 372/5, 20, 21, 22; 359/328, 329, 330

[56] References Cited

U.S. PATENT DOCUMENTS

| | | | |
|---|---|---|---|
| 3,665,338 | 5/1972 | Harris et al. | 331/94.5 |
| 3,731,110 | 5/1973 | Dewey, Jr. | 307/88.3 |
| 4,200,808 | 4/1980 | Herbst | 307/425 |
| 4,269,509 | 5/1981 | Berry et al. | 356/301 |
| 4,270,864 | 6/1981 | Barrett et al. | 356/301 |
| 4,338,578 | 7/1982 | Sukhman | 372/23 |
| 4,349,907 | 9/1982 | Campillo et al. | 372/92 |
| 4,425,652 | 1/1984 | Mourou | 372/69 |
| 4,486,884 | 12/1984 | White | 372/3 |
| 4,512,660 | 4/1985 | Goldberg | 356/301 |
| 4,555,176 | 11/1985 | Moore et al. | 356/301 |
| 4,617,665 | 10/1986 | Mourou et al. | 372/18 |
| 4,646,308 | 2/1987 | Kafka et al. | 372/21 |
| 4,748,631 | 5/1988 | Bjorklund | 372/21 |
| 4,761,059 | 8/1988 | Yeh et al. | 350/354 |
| 4,791,631 | 12/1988 | Baumert et al. | 372/22 |
| 4,791,927 | 12/1988 | Menger | 128/303.1 |
| 4,809,291 | 2/1989 | Byer et al. | 372/75 |
| 4,826,283 | 5/1989 | Chuangtian et al. | 350/96.12 |
| 4,862,886 | 9/1989 | Clarke et al. | 128/303.1 |
| 4,873,692 | 10/1989 | Johnson et al. | 372/20 |
| 4,879,722 | 11/1989 | Dixon et al. | 372/21 |
| 4,884,276 | 11/1989 | Dixon et al. | 372/21 |
| 4,884,277 | 11/1989 | Anthon et al. | 372/22 |
| 4,896,326 | 1/1990 | Kafka et al. | 372/31 |
| 4,897,562 | 1/1990 | Krasinski et al. | 307/427 |
| 4,901,238 | 2/1990 | Kangas | 372/20 |
| 4,907,238 | 3/1990 | Chun et al. | 372/32 |
| 5,025,446 | 6/1991 | Kuizenga | 359/329 |
| 5,034,949 | 7/1991 | Günter | 359/328 |
| 5,047,668 | 9/1991 | Bosenberg | 359/330 |
| 5,144,630 | 9/1992 | Lin | 359/330 |

OTHER PUBLICATIONS

"Tunable, Spectrally Bright Near UV Emission By The Second Harmonic Of A Dye Laser", S. M. Hamadani & G. Magyar, vol. 4, No. 4, Optics Communications, Dec. 1971.

"Generation of Tunable UV From 2610 To 3150 Å", R. W. Wallace, vol. 4, No. 4, Optics Communications, Dec. 1971.

Soviet Physics, "JETP", Letters to the Editor, vol. 15, Nauka Press, Jan. 1972.

"Generation of Ultraviolet Light Using the Nd:YAG Laser", D. P. Schinke, IEEE Journal of Quantum Electronics, vol. QE-8, No. 2, Feb. 1972.

"Generation of Tunable UV Radiation In The Range 216–234 nm", S. G. Dinev, K. V. Stamenov & I. V. Tomov, vol. 5, No. 5, Optics Communications, Aug. 1972.

"Broadly Tunable, Repetitive, Picosecond Parametric Oscillator", Y. Tanaka, T. Kushida & S. Shinoya, vol. 25, No. 2, Optics Communications, May 1978.

"Efficient conversion of 545–680 nm radiation from a tunable dye laser to the near ultraviolet", N. S. Dudina, S. M. Kopylov, L. K. Mikhailov & O. B. Cherednichenko, Jan. 1980 American Institute of Physics, pp. 1468–1469.

(List continued on next page.)

Primary Examiner—Rodney B. Bovernick
Assistant Examiner—Robert E. Wise
Attorney, Agent, or Firm—Lyon & Lyon

[57] ABSTRACT

A compact solid state source of coherent laser light in the range of about 298 nm through about 355 nm utilizes a Nd:YAG or Nd:YLF laser to pump a tunable Ti:Al$_2$O$_3$ laser. The beam from the Nd:YAG/Nd:YLF laser is then combined in a nonlinear optical crystal with the tunable beam from the Ti:Al$_2$O$_3$ laser to provide a continuously tunable laser beam in the range of about 298 nm through about 355 nm.

35 Claims, 1 Drawing Sheet

OTHER PUBLICATIONS

"Growth, Spectroscopy, and Lasing of Titanium-Doped Sapphire", P. Lacovara, L. Esterowitz & M. Kokta, IEEE Journal of Quantum Electronics, vol. QE-21, No. 10, Oct. 1985.

"Spectroscopic and laser characteristics of Ti:Al$_2$O$_3$", P. F. Moulton, vol. 3, No. 1, Jan. 1986, J. Opt. Soc. Am.B.

"Efficient deep-ultraviolet generation by frequency doubling in $\beta$-BaB$_2$O$_4$ crystals", K. Miyazaki, H. Sakai & T. Sato, Dec. 1986, vol. 11, No. 12, Optics Letters.

"BBO's Nonlinear Optical Phase-Matching Properties", Laser Focus, Electro-Optics, Sep. 1987.

"Titanium sapphire laser characteristics", W. R. Rapoport & Chandra P. Khattak, Jul. 1988, vol. 27, No. 13, Applied Optics discusses titanium sapphire laser characteristics.

"Broadly tunable optical parametric oscillation in $\beta$-BaB$_2$O$_4$", L. K. Cheng, W. R. Bosenberg, C. L. Tang, Appl. Phys. Lett 53, Jul. 1988.

"Optical parametric oscillation in a beta-barium borate crystal pumped by an XeCl eximer laser", H. Komine, Aug. 1988, vol. 13, No. 8, Optics Letters.

"Alexandrite laser frequency doubling in $\beta$-BaB$_2$O$_4$ crystals", Da-Wun Chen & Jen-Jye Yeh, Optics Letters, vol. 13, No. 10, Oct. 1988.

"Visible BaB$_2$O$_4$ optical parametric oscillator pumped at 355 nm by a single-axial-mode pulsed source", Y. X. Fan, R. C. Eckardt & R. L. Byer, Appl. Phys. Lett. 53, Nov. 1988.

"New nonlinear-optical crystal: LiB$_3$O$_5$", C. Chen et al., J. Opt. Soc. Am. B, vol. 6, No. 4, Apr. 1989.

"Titanium sapphire's star rises", Laser Focus World, Sep. 1989.

"Highly efficient ultraviolet generation at 355 nm in LiB$_3$O$_5$", B. Wu et al., Optics Letters, vol. 14, No. 19, Oct. 1989.

"Chinese lab grows new nonlinear optical borate crystals", Laser Focus World, Nov. 1989.

"Single frequency stabilized double titanium sapphire ring laser", CLEO 90, May 22, 1990.

"Blue parametric generation from temperature-tuned LiB3O$_5$", Frank Hanson & David Dick, Optics Letters, Feb. 1991, vol. 16, No. 4.

"Noncritically phase-matched second-harmonic generation and optical parametric amplification in a lithium triborate crystal", J. Y. Huang & Y. R. Shen, App. Physc. Lett. Apr. 1991.

"Efficient ultraviolet LiB$_3$O$_5$ optical parametric oscillator", M. Ebrahimzadeh et al., Optics Letters, vol. 16, No. 10, May 1991.

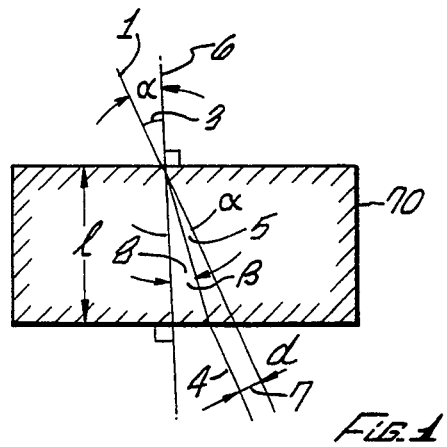
Fig. 1
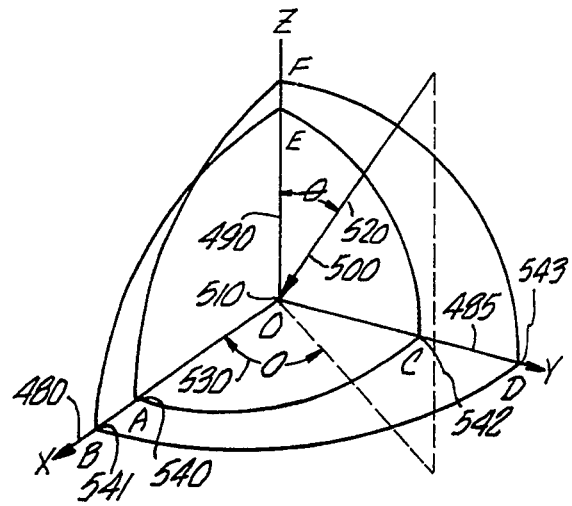
Fig. 5
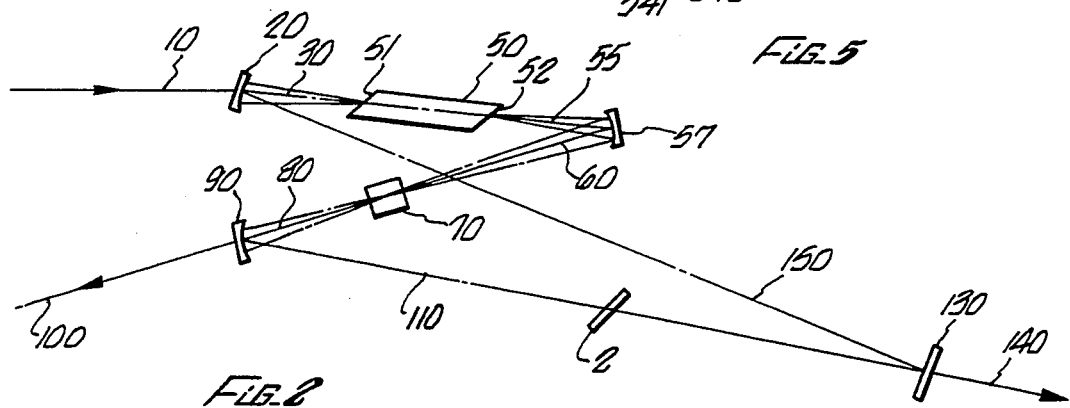
Fig. 2
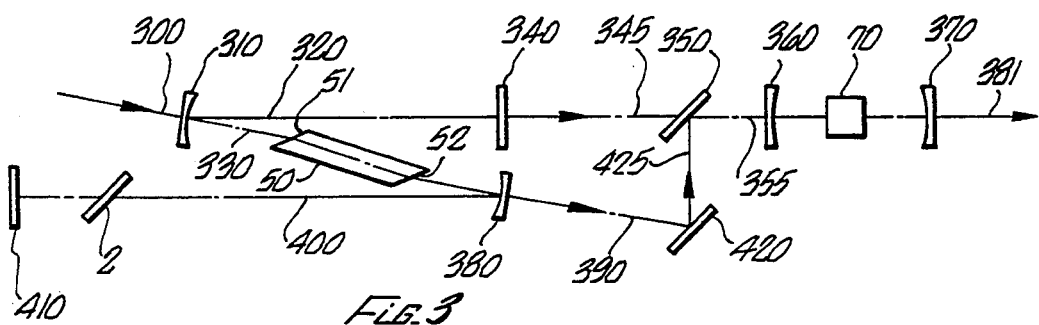
Fig. 3
Fig. 4

CONTINUOUSLY TUNABLE SOLID STATE ULTRAVIOLET COHERENT LIGHT SOURCE

BACKGROUND OF THE INVENTION

1. Field of the Invention

The field of the present invention relates to the field of ultraviolet lasers. More particularly it relates to tunable lasers and continuously tunable ultraviolet lasers for use in medical applications. Still more particularly, it relates to solid state, compact continuously tunable ultraviolet lasers having a coherent output beam variable over the wavelength range of about 298 nanometers ("nm") through about 355 nm.

2. Description of Related Art

Ultraviolet lasers have been found to have much utility in the medical field, particularly in conjunction with laser surgery and laser ablative techniques for removing and/or destroying unwanted material within a living human body. Until now, sufficiently powerful and compact solid state lasers available in the range of about 298 nm to about 355 nm (hereinafter referred to as the "UV" or "ultraviolet") have been few and they have been limited to certain relatively fixed bands of frequencies. Until now, ultraviolet lasers have resisted the techniques that have been used in the visible and infrared ranges of the spectrum to build solid state high power continuously tunable lasers. There is a substantial need, particularly in the medical field, for a compact solid state high power continuously tunable ultraviolet laser the output of which is tunable over a range of wavelengths including the range from about 298 nm through about 355 nm.

SUMMARY OF THE INVENTION

An all solid state continuously tunable ultraviolet coherent light source in the range of about 298 nm through about 355 nm is provided by first providing a solid state pump laser such as, for example, a Q-switched or mode locked, frequency doubled neodymium laser (Nd:YAG or Nd:YLF), having as its output a first beam which may be split into a second beam and a third beam. The second beam is then used as the input to a second and tunable solid state laser such as, for example, a titanium doped sapphire laser (Ti:Al$_2$O$_3$) which will produce as its output a fourth beam. The third beam and the fourth beam are then directed along a common path into a nonlinear optical crystal ("NLO") such as, for example, Beta Barium Borate ("BBO") or Lithium Tri-Borate, LiB$_3$O$_5$ ("LBO"), where they are optically mixed. Additionally, phase matching of the input signals to the NLO is achieved by fixing the optical axes of the NLO with respect to the physical axes of the NLO (X, Y, Z) and adjusting the angle that the incident beam travelling along the common path makes with respect to the NLO by rotating the NLO in synchronization with shifting the lasing wavelength of the Ti:Al$_2$O$_3$ laser. The output wavelength of the device is continuously tunable from about 298 nm through about 355 nm and is limited by the tuning range of the Ti:Al$_2$O$_3$ laser. A broader tuning range replacement for the Ti:Al$_2$O$_3$ laser (currently tunable from about 680 nm to about 1060 nm) would result in a broader tuning range for the solid state continuously tunable ultraviolet coherent light source.

Accordingly, it is an object of this invention to provide a compact solid state apparatus for providing a continuously tunable coherent light beam over the range of about 298 nm through about 355 nm.

Other and further objects and advantages of the present invention will appear hereinafter.

BRIEF DESCRIPTION OF THE DRAWINGS

FIG. 1 is a schematic diagram showing beam displacement as a result of non-linear crystal rotation.

FIG. 2 is a schematic diagram of the optical layout of an intracavity mixing scheme according to a preferred embodiment of the present invention.

FIG. 3 is a schematic diagram of the optical layout of an external cavity mixing scheme according to a preferred embodiment of the present invention.

FIG. 4 is a diagram showing the physical orientation of BBO with respect to the incident beams and its optical axes.

FIG. 5 is a diagram showing the orientation of the incident wave normal with respect to the optical axes of LBO.

DESCRIPTION OF THE PREFERRED EMBODIMENT

Cavity Design

In this device, the nonlinear frequency mixing crystal can be placed either inside the Ti:Al$_2$O$_3$ laser cavity (therefore referred to as "intracavity mixing") or outside the cavity (referred to as "external cavity mixing"). Three major preferred embodiments of the present invention will be shown and described but many more variations are possible within the scope of this invention. Each will provide a tunable output wavelength range from about 298 nm through about 355 nm. A first preferred embodiment is an intracavity mixing scheme. A second preferred embodiment is an external cavity mixing scheme. A third preferred embodiment is an external cavity mixing scheme having a resonator for the UV output beam.

Ti:Al$_2$O$_3$ Tuning

The Ti:Al$_2$O$_3$ laser is tuned in frequency by rotating tuning element 2 as is well known in the art. Tuning element 2 is preferably fabricated of crystalline optical quality quartz as is well known in the art.

Intracavity Mixing Scheme

An all solid state, continuously tunable ultraviolet "UV" coherent light source according to the present invention is shown in FIG. 2. A first beam 10 ["first pump light source"] optimized to drive a Ti:Al$_2$O$_3$ ["tunable laser"] is provided. In a preferred embodiment of this invention, a Q-switched or mode-locked, frequency doubled neodymium laser such as a Nd:YAG or Nd:YLF laser is used to produce a first beam 10. In the case of Nd:YAG, this beam should preferably have a wavelength of about 532 nm. In the case of Nd:YLF, this beam would have a wavelength of about 529 nm.

Preferably the pump laser is a Q-switched or mode-locked, frequency doubled neodymium ("Nd") laser consisting (a) of a pulsed Nd laser with a repetition rate of 1–20 Hz and pulse width of about 10 nsec (Q-switched) or about 100 psec (mode-locked), and energy of about 50–200 mJ/pulse (Q-switched) or about 1–10 mJ/pulse (mode-locked); or (b) of a continuous wave Nd laser with a repetition rate of 1–20 KHz, pulse width of about 80–200 nsec (Q-switched) or about 100 psec (mode-locked), and power of about 5–15 watts. Other lasers could, of course, be used without departing from the inventive concepts herein, including, but not limited to an Argon-Ion laser with an output beam useable by the Ti:Al$_2$O$_3$ laser to produce lasing action. Such lasers are well known in the art and need not be described further herein. For the remainder of this example we will refer to the Nd:YAG laser having an output at 532 nm with the understanding that other lasers could easily be substituted.

The first beam 10 may also be referred to as a "pump" beam. The beam 10 is applied to mirror 20 which is a curved mirror having high transmissivity at 532 nm and high reflectivity at the range of wavelengths at which the Ti:Al$_2$O$_3$ laser operates (about 680 nm through about 1060 nm). The exact radius of curvature of mirror 20 depends upon the specific cavity configuration and can easily be selected by one of ordinary skill in the art. Mirror 20 is designed to transmit beam 10 with minimal loss. Beam 10 is referred to as beam 30 upon passing through mirror 20.

Beam 30 then impinges the Ti:Al$_2$O$_3$ laser 50 having optional Brewster Angle ends 51, 52. The Ti:Al$_2$O$_3$ laser 50 is a tunable laser tunable over the range of about 680 nm through about 1060 nm. It consists preferably of a 15–20 mm long rod shaped piece of Al$_2$O$_3$ doped 0.03%–0.10% by weight with Ti$_2$O$_3$. The diameter isn't critical. Preferably the Brewster Angle ends will be coated with an anti-reflection coating to minimize reflection losses as is well known in the art.

Beam 55 comprises the output of the Ti:Al$_2$O$_3$ laser (as well as the unused portion of the pump beam) and it impinges on mirror 57 which is a high reflectivity mirror over the range of frequencies about 532 nm and the range of frequencies covering the output of the Ti:Al$_2$O$_3$ laser (about 680 nm–1060 nm). Beam 60 (formerly beam 55) exits mirror 57 (also a curved mirror whose radius of curvature is selected so that the beam waist is located inside the NLO 70) and enters nonlinear optical frequency mixing element 70 ("NLO").

NLO 70 may preferably be fabricated of BBO or LBO. Other NLO materials may be used if they are capable of mixing the frequencies involved to produce a UV output. Preferably the frequency mixing crystal 70 is 3–15 mm in length and coated with an antireflection coating to minimize optical reflection at 532 nm and 680 nm–1060 nm. NLO 70 should preferably be positioned with its center at the intracavity beam waist to optimize mixing efficiency. The NLO 70 mixes the Ti:Al$_2$O$_3$ and Nd:YAG beams contained in beam 60 which are directed along a common path to pass through NLO 70 to provide an output on beam 80 which will pass through mirror 90 which should preferably be transparent to UV light. (High transmission at 298–355 nm and high reflection at 680 nm–1060 nm.) Thus beam 100 (the UV output beam) contains the desired output beam of tunable wavelength range about 298 nm through 355 nm. Beam 80 contains the two components of beam 60 together with the UV component.

Mirror 90 is also curved (and has an application specific radius of curvature) and reflects the non-UV components of beam 80 (comprised of the Ti:Al$_2$O$_3$ and Nd:YAG beams remaining due to less than 100% mixing efficiency in the NLO 70) to beam 110. Mirror 130 (coated for partial reflection (output coupling) at 680 nm–1060 nm) is also curved (with an application specific radius of curvature) and feeds back beam 150 to mirror 20.

The output of the Ti:Al$_2$O$_3$ laser (and therefore the UV output of the device) is adjusted by tuning element 2 as well known in the art.

Phase matching is achieved by rotation of the NLO 70 about its Z physical axis (out of the page) to adjust the incident angle of beam 60.

The exact specifications for mirrors 20, 57, 90 and 130 depend upon the dimension and specifications of the structure into which the apparatus will be built. Such exact specifications are well within the knowledge of those skilled in the art and accordingly need not be set forth herein.

Examples of prior art Nd:YAG, Nd:YLF and Ti:Al$_2$O$_3$ lasers are set forth in the prior art articles and patents detailed in the Information Disclosure Statement filed herewith.

External Cavity Mixing Schemes

FIG. 3 shows the optical layout of the external cavity mixing scheme. First beam (input beam) 300 at a wavelength of 532 nm enters the Ti:Al$_2$O$_3$ laser resonator at mirror 310 which is a curved mirror coated for high transmission at 532 nm and high reflection at 680 nm–1060 nm. Beam 300 is referred to as beam 330 upon transmission through mirror 310. Beam 330 then impinges surface 51 of the Ti:Al$_2$O$_3$ rod. Output from surface 52 of the laser rod is a beam consisting of the unused portion of the beam 330 which will be coupled out of the laser cavity upon impinging mirror 380 and the Ti:Al$_2$O$_3$ beam which is folded by mirror 380 (thereafter referred to as beam 400) and continues propagating as the intracavity beam. Beam 400 passes through the frequency selector 2 and is totally reflected by the high reflection mirror 410. Mirror 340 is the output coupler and together with mirror 410 forms the optical resonator of the Ti:Al$_2$O$_3$ laser. Beam 320 is part of the intracavity Ti:Al$_2$O$_3$ laser beam.

Beam 345 (Ti:Al$_2$O$_3$ output beam) and beam 425 (unused portion of 532 nm pump (beam 390) folded by mirror 420 are combined by the beam splitter 350 into beam 355 which enters NLO crystal 70 for nonlinear mixing.

In a preferred embodiment of the present invention, an output cavity resonator is optionally provided: In this embodiment beam 355 (FIG. 3) enters an optional output cavity resonator comprised of mirrors 360, 370 which are coated for high transmission at 532 nm and 680 nm–1060 nm range and high reflection in the 298 nm–355 nm range, and high transmission in the 298 nm–355 nm range and high reflection in the 532 nm and 680 nm–1060 nm range, respectively. Both mirrors 360, 370 have a radius of curvature preferably of 2 cm. These optional mirrors are positioned to act as a UV laser resonator and allow UV output beam 381 to exit the device. NLO 70 is preferably positioned so that its center is at the waist of beam 355 in the UV resonator fabricated of mirrors 360, 370. Mirrors 360, 370 are preferably located approximately 4.0 cm from one another.

Beam 330 enters Ti:Al$_2$O$_3$ laser rod 50 which (as before) is preferably formed of Al$_2$O$_3$ doped 0.03 to 0.10 percent by weight with Ti$_2$O$_3$ and optionally includes Brewster Angle ends 51, 52 as discussed above. Beam 330 then interacts with mirror 380 to form beams 390 (unused portion of the Nd:YAG beam) and 400 (intracavity Ti:Al$_2$O$_3$ beam). Beam 400 passes through tuning element 2 and reflects off mirror 410 which is coated for high reflection at 680 nm–1060 nm. Tuning element 2 is adjustable as discussed above and is preferably formed of crystalline quartz as is well known in the art. Beam 390 (Nd:YAG) reflects off mirror 420 which is coated for high reflectance at 532 nm and is directed into beam combiner 350, where it is combined with the Ti:Al$_2$O$_3$ output into beam 355.

Tuning of the output wavelength of output beam 381 is accomplished by tuning element 2 as discussed above simultaneously with varying the phase match angle by rotating the NLO over a range described in detail below.

Optionally, a servo control system could preferably be incorporated in each of the embodiments described above to synchronize the settings of the two adjustable elements (2, 70) so as to achieve optimized phase matching. Such a system would be well within the knowledge of those of skill in the art and need not be disclosed further herein.

Nonlinear Optical Interactions

The Frequency mixer 70 of a preferred embodiment of the present invention comprises a means for achieving nonlinear frequency mixing of the pump laser beam and the fundamental Ti:Al$_2$O$_3$ beam. In a preferred embodiment of the present invention this function has been implemented using nonlinear optical crystals such as BBO and LBO.

For any nonlinear optical interaction process that involves three optical waves (e.g., harmonic generation, sum-frequency mixing, optical parametric oscillation, etc.), momentum conservation between the three waves is required to obtain maximum energy conversion efficiency. That is:

$$k_1 + k_2 = k_3$$

where $k_i = n_i \omega_i / c$ is the amplitude of the wave vector of the $i^{th}$ wave ($i = 1, 2, 3$), $n_i$ is the index of refraction of the non-linear optical (NLO) material at the frequency of the $i^{th}$ wave, $\omega_i$ is the angular frequency of the $i^{th}$ wave, and c is the speed of light in vacuum. Therefore, $$n_1 \omega_1 + n_2 \omega_2 = n_3 \omega_3$$

This is also referred to as the phase matching (PM) condition. PM can be obtained in a number of ways. The most common one is to make use of the dispersion (n as a function of wave frequency as denoted by the subscript i) and birefringence (n as a function of propagation direction and polarization direction of an optical wave) properties of the NLO materials. In this case, the waves must travel in the NLO material along a predetermined direction. This way of obtaining PM is often called angle phase matching.

For an NLO material of known optical properties such as BBO or LBO, dispersion of the material is described by the so-called Sellmeier equations. For BBO, the Sellmeier equations are $$n_o^2 (\lambda) = 2.7359 + \frac{0.01878}{\lambda^2 - 0.01822} - 0.1354 \lambda^2 \quad (1)$$

$$n_e^2 (\lambda) = 2.7353 + \frac{0.01224}{\lambda^2 - 0.01667} - 0.1516 \lambda^2 \quad (2)$$

where $\lambda$ is the optical wavelength in microns and the subscripts o and e refer to the ordinary ray (whose n does not vary with wave propagation direction) and the extraordinary ray (whose n changes with the wave propagation direction), respectively. For LBO, the published Sellmeier equations are $$n_x^2 = 2.4517 + \frac{0.01177}{\lambda^2 - 0.00921} - 0.0096 \lambda^2 \quad (3)$$

$$n_y^2 = 2.5279 + \frac{0.01652}{\lambda^2 + 0.005459} - 0.01137 \lambda^2 \quad (4)$$

$$n_z^2 = 2.5818 + \frac{0.01414}{\lambda^2 - 0.01186} - 0.01457 \lambda^2 \quad (5)$$

On the other hand, the birefringence property of an NLO material depends on if the material is uniaxial or biaxial. In our case, BBO is uniaxial whose indicatrix is an ellipsoid of revolution, while LBO is biaxial whose index ellipsoid has three unequal axes. Calculation of the PM parameters for a biaxial NLO material is much more complicated than that for a uniaxial one. For BBO (uniaxial), the extraordinary index is given by $$n(\Theta) = \frac{n_e n_o}{(n_o^2 \sin^2 \Theta + n_e^2 \cos^2 \Theta)^{\frac{1}{2}}} \quad (6)$$

where theta ($\Theta$) is the angle between the wave normal and the optical axis of the crystal.

Also, it should be noted that there are Type I (o+o→e) and Type II (e+o→e) phase matching. For nonlinear mixing of Nd:YAG and Ti:Al$_2$O$_3$ beams both BBO and LBO have to be used in Type I mode in order to achieve PM. Type II mode could be used for Second Harmonic Generation Schemes. The Type I phase matching condition for BBO is then:

$$\omega_1 n_o(\omega_1) + \omega_2 n_o(\omega_2) = \omega_3 \frac{n_e(\lambda_3) n_o(\lambda_3)}{[n_o^2(\lambda_3)\sin^2\Theta + n_e^2(\lambda_3)\cos^2\Theta]^{\frac{1}{2}}} \quad (7)$$

Numerically solving the above equation results in the proper propagation direction of the two waves to be mixed inside the NLO crystal at a specific wavelength.

In the case of LBO, the fact that it is a biaxial crystal makes calculation of the PM parameters much more complex than is the case for BBO. The index ellipsoid for a biaxial crystal can be described by the following $$\frac{\sin^2\Theta \cos^2\phi}{n_i^{-2} - n_{xi}^{-2}} + \frac{\sin^2\Theta \sin^2\phi}{n_i^{-2} - n_{yi}^{-2}} + \frac{\cos^2\Theta}{n_i^{-2} - n_{zi}^{-2}} = 0 \quad (8)$$

where $(\Theta, \phi)$ specify the propagation direction of the optical wave of frequency $\omega_i$, $n_{xi}$, $n_{yi}$, and $n_{zi}$ are the three principal refractive indices of the wave in the NLO crystal 70. The Type I Phase Matching ("PM") parameters can be obtained by numerically solving the following set of equations:

$$\frac{\sin^2\Theta \cos^2\phi}{n_1^{-2} - n_{x1}^{-2}} + \frac{\sin^2\Theta \sin^2\phi}{n_1^{-2} - n_{y1}^{-2}} + \frac{\cos^2\phi}{n_1^{-2} - n_{z1}^{-2}} = 0 \quad (9)$$

$$\frac{\sin^2\Theta \cos^2\phi}{n_2^{-2} - n_{x2}^{-2}} + \frac{\sin^2\Theta \sin^2\phi}{n_2^{-2} - n_{y2}^{-2}} + \frac{\cos^2\phi}{n_2^{-2} - n_{z2}^{-2}} = 0 \quad (10)$$

$$\frac{\sin^2\Theta \cos^2\phi}{n_3^{-2} - n_{x3}^{-2}} + \frac{\sin^2\Theta \sin^2\phi}{n_3^{-2} - n_{y3}^{-2}} + \frac{\cos^2\phi}{n_3^{-2} - n_{z3}^{-2}} = 0 \quad (11)$$

$$\omega_1 n_1' + \omega_2 n_2' = \omega_3 n_3'' \quad (12)$$

Where $n''_1$ and $n''_2$ are the larger (i.e., slow ray refractive indices) of the two positive real roots of Eqs. (9)

and (10), respectively, and $n\Delta_3$ is the smaller (i.e., fast ray refractive index) of the two positive real roots of Eq. (11).

By phase matching the input signals to the BBO and LBO, the desired mixed output is possible. Phase matching is accomplished as follows: With BBO it is desireable to use a single BBO crystal to cover the desired range of output wavelengths. To this end, the BBO crystal is preferably cut with an angle $\phi$ corresponding to the middle of the range of output wavelengths desired. Therefore, rotation of the BBO assembly about the Z physical axis will allow the incident beam to vary over the entire range of $\phi$ corresponding to the desired range of output wavelengths. See FIG. 4 for a diagram showing the incident beams on the BBO crystal, the optical axis, $\phi$, and the physical orientation of the BBO crystal with respect to the incident beams and the optical axis.

In LBO there are two optical axes to worry about. In a preferred embodiment $\Theta$ is chosen as 90° and $\phi$ is varied. This corresponds to Type I mixing. In Type I three wave mixing, the two input waves are of similar polarization—either "ordinary" or "extraordinary". The output wave polarization is perpendicular to those of the input—thus two "o" waves yield an "e" wave or two "e" waves yield an "o" wave. See FIG. 5 for a diagram showing the incident beam on the LBO crystal, the definitions of $\Theta$ and $\phi$ and the physical orientation of the LBO crystal with respect to the incident beams and optical axes. In FIG. 5, x (480), y (485), and z (490) represent the principal optical axes of the biaxial crystal. Vector 500 represents a vector normal to the incident wave directed to the origin O (510), whose direction is defined by angles $\Theta$ (520), $\phi$ (530). A-F (540-545) are the intersections of the wave vector surface with the three principal planes: x-y, y-z, x-z.

As rotation of the LBO/BBO crystal and the tuning of the birefringent filter corresponding to Ti:Al$_2$O$_3$ laser output frequency are synchronized so that phase matching is maintained, it would be trivial to provide automated control, as with a computer and servo or step motors, to control them so as to yield maximum light output at the desired wavelength. Such a control system is well within the knowledge of those of skill in the art and need not be disclosed further herein.

BBO

Using the published Sellmeier's equations discussed above of the BBO crystal, we found that the crystal must be operated in the Type I mode and Type II did not allow phase matching necessary for the nonlinear frequency mixing process in our Application. Table I summarizes the results of our calculations. In Table I the "pump wavelength" refers to the wavelength of the first beam 10. The "Ti:Al$_2$O$_3$ Laser Wavelength" refers to the preset wavelength at which the Ti:Al$_2$O$_3$ laser will be operating. The "Tunable UV Laser Output Wavelength" refers to the wavelength of output beam 100. The "Phase Match Angle for BBO Crystal" refers to the angle (inside the BBO crystal) between the propagation direction of the beams to be mixed and the crystal optical axis. The "Effective Nonlinear Coefficient $D_{eff}$" refers to an important parameter, whose magnitude, to a large extent, affects the efficiency of the nonlinear mixing process. Its unit is in pM/V or pico meters per volt ($10^{-12}$ M/V).

TABLE I

| Pump Wavelength | Ti:Al$_2$O$_3$ Laser Wavelength | Tunable UV Laser Output Wavelength | Phase Match Angle for BBO Crystal | Effective Nonlinear Coefficient $D_{eff}$ |
|---|---|---|---|---|
| 532 nm | 680 nm | 298.5 nm | 40.39° | 2.08 pM/V |
|  | 700 nm | 302.3 nm | 39.67° | 2.10 |
|  | 720 nm | 305.9 nm | 38.99° | 2.12 |
|  | 740 nm | 309.5 nm | 38.34° | 2.14 |
|  | 760 nm | 312.9 nm | 37.73° | 2.15 |
|  | 780 nm | 316.3 nm | 37.15° | 2.17 |
|  | 800 nm | 319.5 nm | 36.61° | 2.18 |
|  | 820 nm | 322.7 nm | 36.09° | 2.19 |
|  | 840 nm | 325.7 nm | 35.59° | 2.21 |
|  | 860 nm | 328.7 nm | 35.12° | 2.22 |
|  | 880 nm | 331.6 nm | 34.67° | 2.23 |
|  | 900 nm | 334.4 nm | 34.24° | 2.24 |
|  | 920 nm | 337.1 nm | 33.82° | 2.25 |
|  | 940 nm | 339.7 nm | 33.42° | 2.26 |
|  | 960 nm | 342.3 nm | 33.04° | 2.26 |
|  | 980 nm | 344.8 nm | 32.68° | 2.27 |
|  | 1000 nm | 347.3 nm | 32.33° | 2.28 |
|  | 1020 nm | 349.6 nm | 31.99° | 2.29 |
|  | 1040 nm | 351.9 nm | 31.35° | 2.29 |
|  | 1060 nm | 354.2 nm | 31.35° | 2.30 |

In accordance with Table I, to obtain output in the range between about 298.5 nm through about 355 nm requires simultaneous adjustment of (1) the fundamental wavelength of the tunable Ti:Al$_2$O$_3$ laser in the range of between about 680 through about 1060 nm and (2) the phase match angle of the BBO crystal in the range between about 40.39 and about 31.35 degrees.

The phase match angle of the BBO crystal is adjusted in a preferred embodiment by rotating NLO 70 about its Z physical axis. For a BBO NLO crystal, we can use one piece of this crystal cut at a phase matching angle of 35.85 degrees. That is, the optical axis 470 makes an angle of 35.85 degrees with its X physical axis 475 (see FIG. 4). This crystal will preferably be mounted on a rotary stage to allow angular adjustment of ±4.5 degrees (with 0 corresponding to 35.85 degrees of phase matching). It should be noted here that ±4.5 degrees are the angles inside the crystal 70 (internal angle) corresponding to $\beta$ [8] in FIG. 1. The corresponding external angle is the product of the internal angle and the refractive index of the mixing NLO crystal 70 at the appropriate wavelength. The external angle in our case was found to be approximately ±7.2 degrees and corresponds to $\alpha$ [3,5] in FIG. 1. As discussed above, adjustment of the tuning element 2 and NLO on a the rotary stage should, preferably, be synchronized with computer control to satisfy the one-to-one relationship between the tunable Ti:Al$_2$O$_3$ laser wavelength and the BBO phase match angle as set forth in Table I and derived from the Sellmeier equations. Such computer control is well known to those of skill in the art and need not be disclosed further herein. It is also clear that computer control is not necessary to the practice of all of the inventions disclosed herein.

Where it is desirable to make a more compact instrument and the large intracavity beam displacement due to the large angular adjustment (±7.2 degrees to cover the complete wavelength range) is unacceptable (see Table III for the values of beam displacement), two NLO crystals can be used, one inserted into the cavity at a time, to cover the complete tuning range. If this is the case, the crystals may preferably be cut with phase matching angles of 33.6 and 38.1 degrees, respectively, and each will have a ±2.25 degrees (internal) or ±3.6 degrees (external) tuning range. Preferably, the selection of the appropriate NLO crystal having appropriate phase matching angle could also be performed automatically, under computer control, as would be well known to those of skill in the art.

certain angle. The figures in Table III may be used as a guideline in cavity design where beam displacement due to crystal rotation needs to be taken into account.

TABLE III

| Crystal Type | No. of Crystals To Be Used | Phase Match Angle | Tuning Angle Interior | Tuning Angle Exterior | Displacement (mm) for Crystal Length: | | | |
|---|---|---|---|---|---|---|---|---|
| | | | | | 3 mm | 5 mm | 10 mm | 15 mm |
| BBO | 1 | 35.85° | ±4.5° | ±7.2° | .14 | .24 | .47 | .71 |
| | 2 | 33.6° 38.1° | ±2.25° | ±3.6° | .07 | .12 | .24 | .35 |
| LBO | 3 | 42.5° 50.5° 58.5° | ±4.0° | ±6.9° | .21 | .42 | .85 | 1.27 |
| | 4 | 41° 47° 53° 59° | ±3.0° | ±4.8° | .09 | .16 | .31 | .47 |

Note:
PM Angle = angle $\phi$ for both BBO and LBO. In case of LBO, angle $\Theta$ is 90 degrees.

LBO

Using the published Sellmeier's equations discussed above for LBO, we found LBO is phase matchable for our immediate application only when operated in the Type I mode. Table II summarizes the results of our calculations.

In Table II, the term "Pump Wavelength" refers to the wavelength of the first beam 10 in FIG. 2. The term "Ti:Al$_2$O$_3$ Laser Wavelength" refers to the operating wavelength of the Ti:Al$_2$O$_3$ laser. The term "Tunable UV Laser Output Wavelength" refers to the wavelength of output beam 100 in FIG. 2. The term "Phase Match Angle 1 for LBO PM ($\Theta$)" refers to the angle from the z optical axis of the LBO crystal to the incident wave normal. The term "Phase Match Angle 2 for LBO PM ($\phi$)" refers to the angle from the x optical axis of the LBO crystal to the projection of the incident wave normal in the x-y plane. The term "Effective Non Linear Coefficient D$_{eff}$" is the same as in Table I which is approximately 1.0 pM/V (pico meters per volt), in the spectral region of interest herein.

TABLE II

| Pump Wavelength | Ti:Al$_2$O$_3$ Laser Wavelength | Tunable UV Laser Output Wavelength | Phase Match Angle 1 for LBO PM ($\Theta$) | Phase Match Angle 2 for LBO PM ($\phi$) | Effective Nonlinear Coefficient D$_{eff}$ |
|---|---|---|---|---|---|
| 532 nm | 680 nm | 298.5 nm | 90° | 62.50° | 1.0 pM/V |
| | 700 | 302.3 | | 60.17° | |
| | 750 | 311.2 | | 55.60° | |
| | 800 | 319.5 | | 51.77° | |
| | 850 | 327.2 | | 48.50° | |
| | 900 | 334.4 | | 45.73° | |
| | 950 | 341.0 | | 43.20° | |
| | 1000 | 347.3 | | 41.00° | |
| | 1060 | 354.2 | | 38.56° | |

From Table II, it is seen that to cover the complete tuning range requires that the NLO 70 be rotated about its center cut angle (50.53 degrees) by ±11.97 degrees. As mentioned above, this rotation may result in a beam displacement too large to be acceptable in a compact laser cavity. Therefore, multiple selectable crystals may be used and the exact number of crystals depends on the specific cavity design configuration. Table III lists the calculated beam displacement as a function of NLO 70 element length, 1. FIG. 1 shows how the beam is displaced when it enters the tuning element crystal at a LBO-Noncritically phase matched by temperature tuning In this case, the LBO crystal is cut such that the beams will travel along the x optical axis of the crystal ($\Theta=90°$, and $\phi=0°$) and phase matching is achieved by putting the crystal into an oven of a continuously adjustable temperature. The appropriate temperature for phase matching at any wavelength within the tuning range may simply be determined by mapping the phase matching against oven temperature and utilizing a simple computer control system to select the appropriate oven temperature for the wavelength desired. Such a procedure is well within the knowledge of those of skill in the art and need not be disclosed further herein. This configuration of preparing the NLO crystal 70 ($\Theta=90°$, $\phi=0°$) and achieving PM via temperature adjustment is also referred to as noncritical phase matching which solves the well known "walk-off" problem which is well known in the art and therefore will not be described herein. Accordingly, the use of longer nonlinear mixing crystals is made possible which results in improved mixing efficiency.

While embodiments and applications of this invention have been shown and described, it would be apparent to those of skill in the art that many more modifications are possible without departing from the inventive concepts disclosed herein. The invention, therefore, is not to be restricted except in the spirit of the appended claims.

What is claimed is:
1. An ultraviolet light source comprising:
a first pump light source comprising a laser,
a tunable laser driven by said first pump light source to provide a second light source,
a non-linear optical frequency mixing element optically coupled to said first pump light source and said second light source wherein said nonlinear optical frequency mixing element is fabricated of BBO.

2. An ultraviolet light source comprising:
a first pump light source comprising a laser,
a tunable laser driven by said first pump source to provide a second light source,
a non-linear optical frequency mixing element optically coupled to said first pump light source and said second light source wherein said non-linear optical frequency mixing element is fabricated of LBO.

3. An ultraviolet light source comprising:
a first pump light source comprising a laser, a tunable laser driven by said first pump source to provide a second light source, a non-linear optical frequency mixing element optically coupled to said first pump light source and said second light source, and means for directing light from said first pump light source and light from said second light source along a common path.

4. The ultraviolet light source of claim 3 wherein said non-linear optical frequency mixing element is located along said common path.

5. The ultraviolet light source of claim 4 wherein said non-linear optical frequency mixing element is fabricated of BBO.

6. The ultraviolet light source of claim 5 wherein the optical axis of said BBO is oriented at an internal angle $\phi$ of from about 31.35° to about 40.39° with respect to said common path.

7. An ultraviolet light source according to claim 6 oriented in an internal cavity mixing scheme.

8. An ultraviolet light source according to claim 6 oriented in an external cavity mixing scheme.

9. An ultraviolet light source according to claim 8 additionally comprising an output cavity resonator.

10. The ultraviolet light source of claims 4 wherein said non-linear optical frequency mixing element is fabricated of LBO.

11. The ultraviolet light source of claim 10 wherein said LBO is oriented at internal angles of $\Theta = 90°$ and $\phi$ between about 38.56° and about 62.50° with respect to said common path.

12. An ultraviolet light source according to claim 11 oriented in an internal cavity mixing scheme.

13. An ultraviolet light source according to claim 11 oriented in an external cavity mixing scheme.

14. An ultraviolet light source according to claim 13 wherein said non-linear optical frequency mixing element is located within a UV resonator.

15. The ultraviolet light source of claim 3 wherein said non-linear optical frequency mixing element includes a center, said common path includes a beam waist, and said center is arranged so that said beam waist is located at said front surface.

16. An ultraviolet light source, continuously tunable over a range of about 298 nm to about 355 nm comprising:

a first pump light source, a tunable laser driven by said first pump light source to provide a second light source, a non-linear optical frequency mixing element optically coupled to said first pump light source and said second light source.

17. The ultraviolet light source of claim 16 wherein said non-linear optical frequency mixing element is fabricated of BBO.

18. The ultraviolet light source of claim 16 wherein said non-linear optical frequency mixing element is fabricated of LBO.

19. The ultraviolet light source of claim 16 including means for directing light from said first pump light source and light from said second light source along a common path.

20. The ultraviolet light source of claim 19 wherein said non-linear optical frequency mixing element is located along said common path.

21. The ultraviolet light source of claim 20 wherein said non-linear optical frequency mixing element is fabricated of BBO.

22. The ultraviolet light source of claim 21 wherein the optical axis of said BBO is oriented at an angle $\phi$ of from about 31.35° to about 40.39° with respect to said common path.

23. An ultraviolet light source according to claim 22 oriented in an internal cavity mixing scheme.

24. An ultraviolet light source according to claim 22 oriented in an external cavity mixing scheme.

25. An ultraviolet light source according to claim 24 wherein said non-linear optical frequency mixing element is located within a UV resonator.

26. The ultraviolet light source of claims 20 wherein said non-linear optical frequency mixing element is fabricated of LBO.

27. The ultraviolet light source of claim 26 wherein the z principal optical axis of said LBO is oriented at an angle $\Theta$ of 90° with respect to said common path.

28. The ultraviolet light source of claim 27 wherein the x principal optical axis of said LBO is oriented at an angle $\phi$ in the x-y principal plane of from about 38.56° to about 62.50° with respect to said common path.

29. An ultraviolet light source comprising:

a first pump light source, a tunable laser driven by said first pump light source to provide a second light source, a non-linear optical frequency mixing element optically coupled to said first pump light source and said second light source, means for directing light from said first pump light source and light from said second light source along a common path, said non-linear optical frequency mixing element located along said common path, said non-linear optical frequency mixing element mounted on a rotary stage, wherein said non-linear optical frequency mixing element is fabricated of BBO.

30. The ultraviolet light source of claim 29 wherein the optical axis of said BBO is oriented at an angle $\phi$ of from about 31.35° to about 40.39° with respect to said common path.

31. The ultraviolet light source of claim 30 wherein said non-linear optical frequency mixing element is located within a UV resonator.

32. An ultraviolet light source comprising:

a first pump light source, a tunable laser driven by said first pump light source to provide a second light source, a non-linear optical frequency mixing element optically coupled to said first pump light source and said second light source, means for directing light from said first pump light source and light from said second light source along a common path, said non-linear optical frequency mixing element located along said common path, means for controlling the temperature of said non-linear optical frequency mixing element to provide phase matching of said light from said first pump light source and said light from said second light source within said non-linear optical frequency mixing element.

33. The ultraviolet light source of claim 32 wherein said non-linear optical frequency mixing element is fabricated of BBO.

34. The ultraviolet light source of claim 32 wherein said non-linear optical frequency mixing element is fabricated of LBO.

35. The ultraviolet light source of claim 32 wherein said non-linear optical frequency mixing element includes a center arranged so that light along said common path impinges said center at a beam waist of said light along said common path.

* * * * *

UNITED STATES PATENT AND TRADEMARK OFFICE
CERTIFICATE OF CORRECTION

PATENT NO. : 5,363,388
DATED : November 8, 1994
INVENTOR(S) : Weiquang Shi, Warren Grundfest It is certified that error appears in the above-indentified patent and that said Letters Patent is hereby corrected as shown below:

Column 8, Table 1, the Phase Match Angle entry corresponding to a Ti: $Al_2O_3$ Laser Wavelength of 1040 nm should be -- 31.66° -- rather than "31.35°". Column 11, line 24, delete the "s" in "claims"; column 11, line 40, insert -- said light along -- before "said common path"; column 11, line 42, replace "front surface" with -- center --.

Signed and Sealed this

Twenty-seventh Day of May, 1997

Attest:

BRUCE LEHMAN

Attesting Officer

Commissioner of Patents and Trademarks